(12) United States Patent
Fermor et al.

(10) Patent No.: US 8,942,232 B1
(45) Date of Patent: Jan. 27, 2015

(54) MULTI-STAGE SWITCHING TOPOLOGY

(75) Inventors: David Fermor, Sunnyvale, CA (US);
Junlan Zhou, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 332 days.

(21) Appl. No.: 13/364,712

(22) Filed: Feb. 2, 2012

(51) Int. Cl.
*H04Q 11/00* (2006.01)
*H04L 12/933* (2013.01)

(52) U.S. Cl.
CPC ........ *H04L 49/15* (2013.01); *H04Q 2011/0052* (2013.01)
USPC .......................................................... 370/388

(58) Field of Classification Search
CPC .. H03K 17/002; H04L 12/5601; H04L 45/00; H04L 49/15; H04L 49/1515; H04Q 3/68; H04Q 11/0005
See application file for complete search history.

(56) References Cited

U.S. PATENT DOCUMENTS

| | | | |
|---|---|---|---|
| 5,884,090 A * | 3/1999 | Ramanan et al. | 712/13 |
| 6,535,516 B1 * | 3/2003 | Leu et al. | 370/395.72 |
| 7,342,922 B1 * | 3/2008 | Vanesko | 370/380 |
| 2005/0058128 A1 * | 3/2005 | Carson et al. | 370/388 |
| 2007/0014299 A1 * | 1/2007 | Chang | 370/397 |
| 2007/0099494 A1 * | 5/2007 | Niazi et al. | 439/540.1 |
| 2007/0147364 A1 * | 6/2007 | Palacharla et al. | 370/389 |
| 2008/0151863 A1 * | 6/2008 | Lawrence et al. | 370/351 |

* cited by examiner

*Primary Examiner* — Yong Zhou
(74) *Attorney, Agent, or Firm* — Lerner, David, Littenberg, Krumholz & Mentlik, LLP

(57) ABSTRACT

A multi-stage switching fabric provides a first tier and a second tier. The first tier may include a first plurality of switches, and the second tier may include a second plurality of switches, wherein each of the switches in the first tier are coupled to the switches in the second tier. Each of the switches in the first and second tiers may include a plurality of switching chips, wherein a given switching chip in a given switch is coupled to each other switching chip in the given switch. The fabric may further include a third tier comprising one or more core switches, wherein each switch in the second tier is coupled to at least one of the core switches.

21 Claims, 11 Drawing Sheets

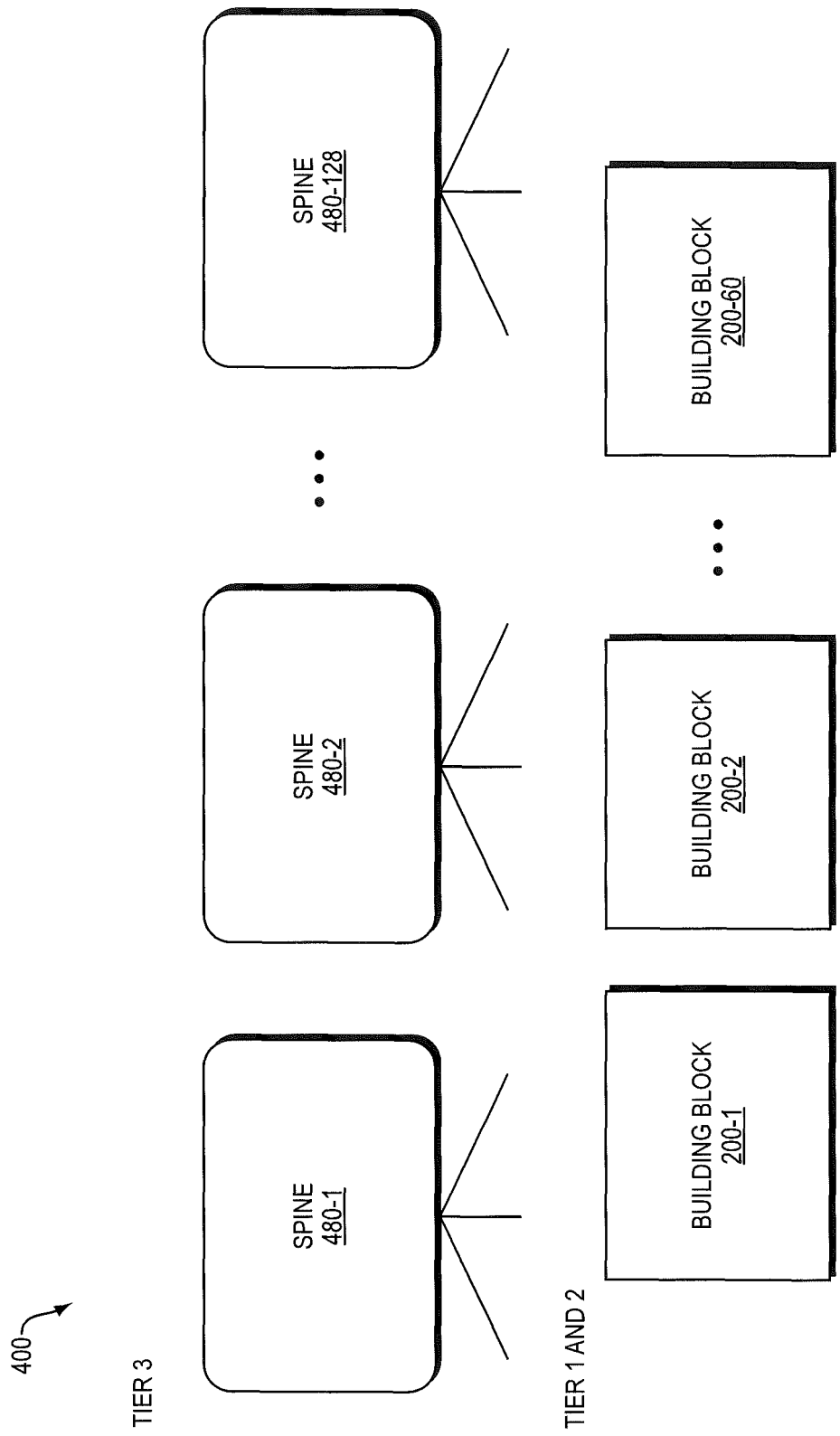

MULTI-STAGE SWITCHING TOPOLOGY

BACKGROUND OF THE INVENTION

Data center networking fabric costs are largely based on box to box interconnects and by the cost of the intelligent switching components that form the switching elements that build up the fabric. The presently favored approach to building data centers is by using the Clos architecture, which is targeted at supporting fully connected non-blocking fabric. However, fabrics built utilizing the Clos architecture can be costly in terms of both chip count and scalability quantization costs, and lead to stranding of bandwidth and hence cost to the user. More recent architectures such as flattened butterfly and Dragonfly have emerged as alternative lower-cost architectures but suffer from performance issues and complexity in other areas such as oversubscription and manageability.

SUMMARY OF THE INVENTION

One aspect of the technology provides a switching fabric, comprising a first tier comprising a first plurality of switches, a second tier comprising a second plurality of switches, wherein the switches in the first tier are coupled to the switches in the second tier, and a third tier comprising one or more core switches, wherein each switch in the second tier is coupled to at least one of the core switches. Each switch of the first plurality of switches and second plurality of switches may comprise a plurality of switching chips, each of the plurality of switching chips being coupled to each other switching chip in the switch. The fabric may further comprise a building block made up of the first and second tier switches. For example, the building block may comprise 16 of the first plurality of switches and 16 of the second plurality of switches, wherein each switching chip in the first plurality of switches is linked to at least one switch in the second plurality of switches. Even further, the fabric may comprise a supercluster. The supercluster may comprise a plurality of building blocks and a plurality of core switches, wherein each building block is coupled to an uplink to each of the plurality of core switches.

Another aspect of the technology provides a switch, comprising a plurality of switching chips, and a plurality of link bundles. The plurality of link bundles may couple at least one of the plurality of switching chips to each of the other switching chips. For example, each switching chip in the switch may be linked to each other switching chip in the switch via the plurality of link bundles.

Another aspect of the technology provides a network fabric, comprising a superblock, the superblock comprising a first tier comprising a plurality of switching chips, the switching chips being linked to host devices, and a second tier comprising a plurality of arrays, each of the plurality of arrays comprising a predetermined number of switching chips, wherein at least one first switching chip is linked to each other switching chip in the array. Each of the plurality of switching chips in the first tier may be linked to the at least one first switching chip in each array.

Yet another aspect of the technology provides a method of routing data within a network fabric comprising at least one switch, wherein the at least one switch comprises a first plurality of switching chips, each switching chip being linked to each other switching chip in the switch, and at least one processor adapted to control the plurality of switching chips. The method may comprise receiving data traffic at a first switching chip and distributing the data traffic to each of the other switching chips in the first plurality of switching chips. Moreover, the traffic may be transmitted to a block, the block comprising a second plurality of switching chips arranged in a topological hierarchy with respect to the at least one switch. It may be determined whether the traffic destination is linked to a lower switching chip in the topological hierarchy, wherein the lower switching chip is also linked to one of the second plurality of switching chips. The traffic may be transmitted to the lower switching chip if the traffic destination is so linked, and may be transmitted to a higher device in the topological hierarchy if the traffic destination is not so linked. Even further, the traffic may be distributed among each of the second plurality of switching chips in the block.

BRIEF DESCRIPTION OF THE DRAWINGS

FIG. 4A illustrates a supercluster according to an aspect of the technology.

DETAILED DESCRIPTION

The present technology provides a switching topology including a multi-stage arrangement of independent switches. This topology may be used in various networks, such as data centers, wide area networks (WANs), local area networks (LANs), and multiple core chips. The topology addresses an arrangement of switching chips in a switch or router, as well as an arrangement of the switches with respect to one another and other network components.

Figure 1:
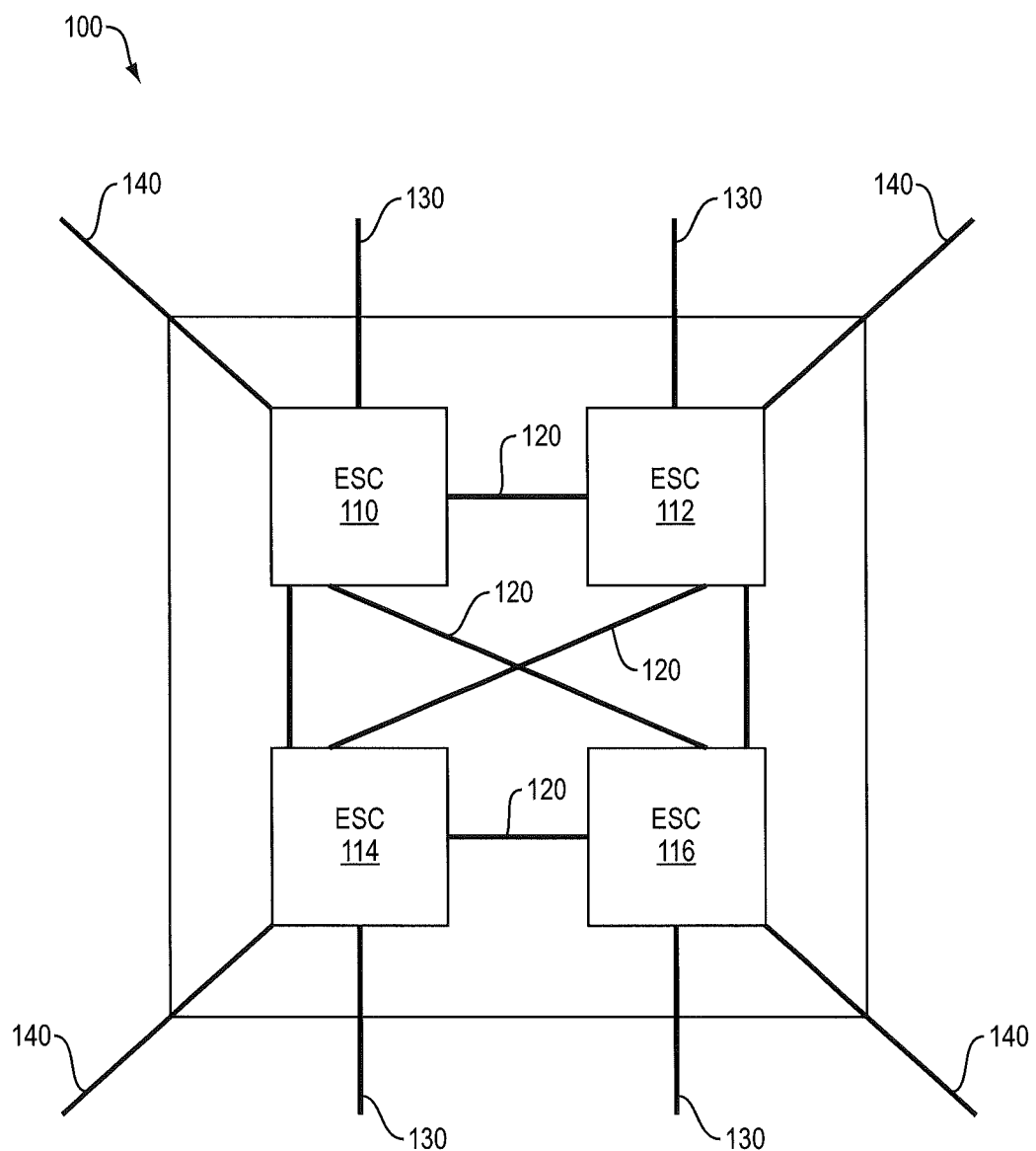
FIG. 1 illustrates a switch according to an aspect of the technology.

FIG. 1 illustrates a switch 100 according to an aspect of the technology. The switch 100 includes a plurality of chips, such as Ethernet switching chips (ESCs) 110-116, electrically coupled with one another. Particular ESCs 110-116 may also be electrically coupled to components outside the switch 100, as will be explained in further detail below.

The ESCs 110-116 may be any device capable of switching packets from one port to another. The ESCs may each include a processor and a memory. The memory may include a forwarding table, and the processor may communicate with the memory to determine how received packets should be routed. The ESCs may be conventional switching chips, such as those currently manufactured by Broadcom Corp., Fulcrum Microsystems, Inc., Fujitsu Microelectronics, Inc., LSI Corp., etc. Alternatively, the ESCs may be silicon chips specially designed for the building block 100. For example, the ESCs may be designed to include a specified number of ports or to operate within predefined constraints. Although only four ESCs 110-116 are shown in FIG. 1, it should be understood that any number of ESCs 110-116 may be included in the switch 100.

The ESCs 110-116 may be interconnected via a number of intra-switch links 120. For example, according to one aspect, each ESC 110-116 may be electrically coupled to some or all of the other ESCs in the switch via an integrated wiring scheme. The connection between the ESCs 110-116 may comprise a bundle of integrated parallel communication channels or links 120. Such integration may reduce an amount of cabling needed to interconnect the ESCs, and may also result in a relatively low latency (e.g., 0.75 µs or 1.5 µs). According to one aspect, a bundle of 8 links 120 may be used to form the connections between the ESCs 110-116. These links 120 may be, for example, 40 GE capable, Quad Small Form-factor Pluggable (QSFP) based, and compatible with commercially available interfaces for connecting peripheral devices to a computer via an expansion bus, such as Lightpeak or Thunderbolt. The arrangement of the ESCs 110-116 in the switch 100 may advantageously provide dynamic load balancing. Moreover, the switch 100 may be Equal Cost Multi Path (ECMP) routing enabled, explicit congestion notification (ECN) enabled, or quantized congestion notification (QCN) enabled.

The ESCs 110-116 may also be coupled to devices outside the switch 100, such as servers and other components of the fabric. For example, each of the ESCs may be coupled to other fabric components (e.g., elements of another switch) via inter-switch links 130. These inter-switch links 130 may also comprise bundles of multiple links. For example, according to one aspect, the inter-switch links 130 may be bundles of 16 links. The ESCs 110-116 may also be coupled to host computers or servers via server links 140. These server links 140 may comprise bundles of multiple (e.g., 16-24) links as well.

The switch 100 may be capable of intra-switch routing of traffic such as data packets. For example, traffic generated at a host device coupled via one of the server links 140 may have a destination, such as another host device, which is also coupled to the switch 100. The traffic may be routed through the switch 100 to its destination in one or two hops.

Figure 2:
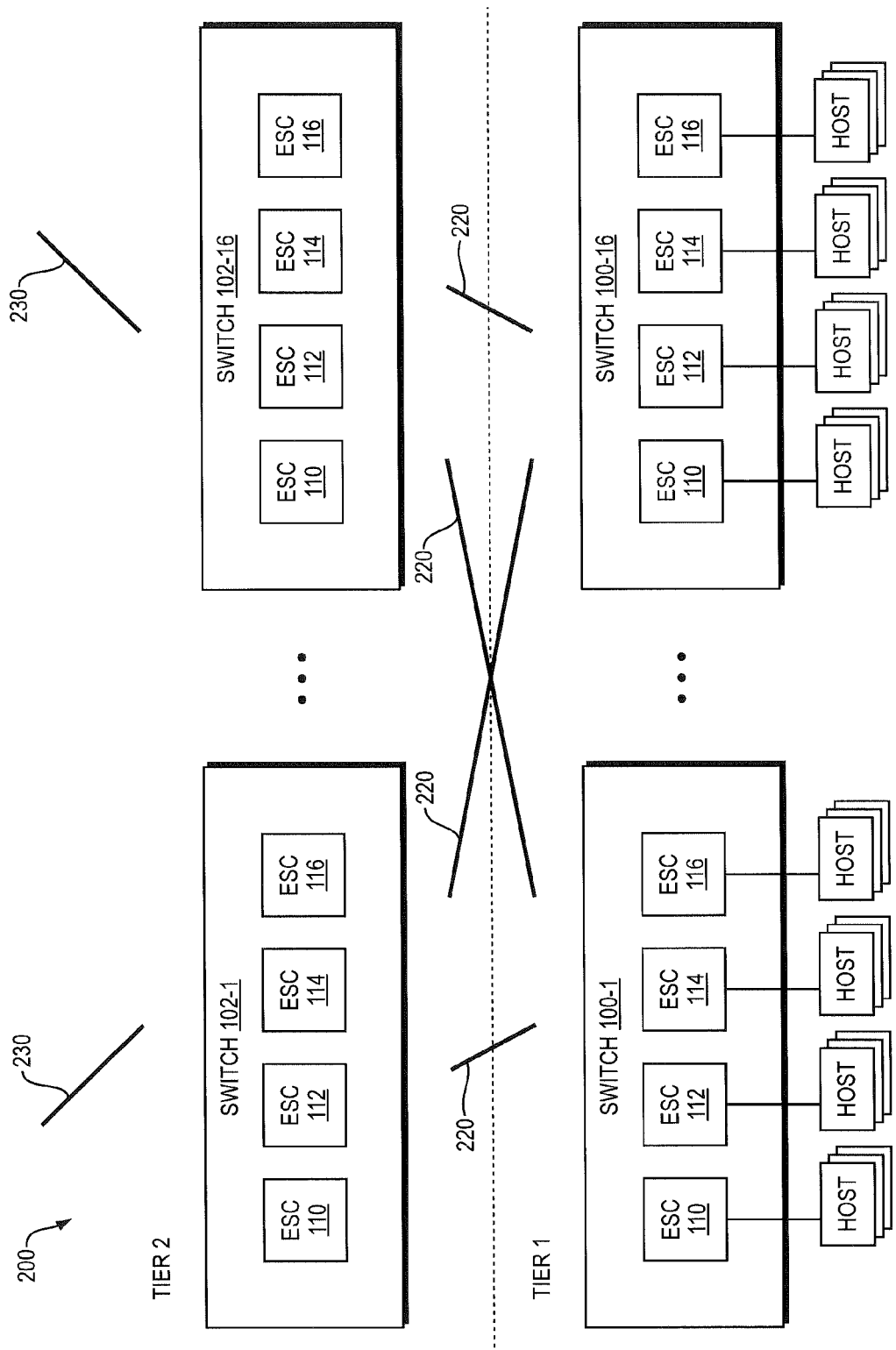
FIG. 2 illustrates a building block according to an aspect of the technology.

The switches 100 may be arranged within a building block 200, as shown in FIG. 2. For example, the switches 100 may be arranged in two tiers. The first tier may include a given number of switches 100. In the example shown in FIG. 2, the first tier includes 16 switches, labeled 100-1 through 100-16. However, it should be understood that more or less than sixteen switches 100 may be included in the first tier. For example, more switches 100 may be added to accommodate a greater number of host devices. The second tier may also include a given number of switches 102, which may be the same or different than the number of switches 100 in the first tier. In the example of FIG. 2, 16 switches, labeled as 102-1 through 102-16, are present in the second tier. Similar to the first tier, the second tier may be expanded to include a greater number of switches 102.

The switches in the first tier and the second tier may be interconnected via uplinks 220. An example of how these interconnections are made is provided with respect to FIG. 3. The uplinks 220 may be, for example 10 GE capable. The switches 102-1 through 102-16 in the second tier may be further coupled to devices in a third tier, such as a spine or core switch, via uplinks 230. These uplinks 230 may be, for example, 40 GE capable.

Figure 3:
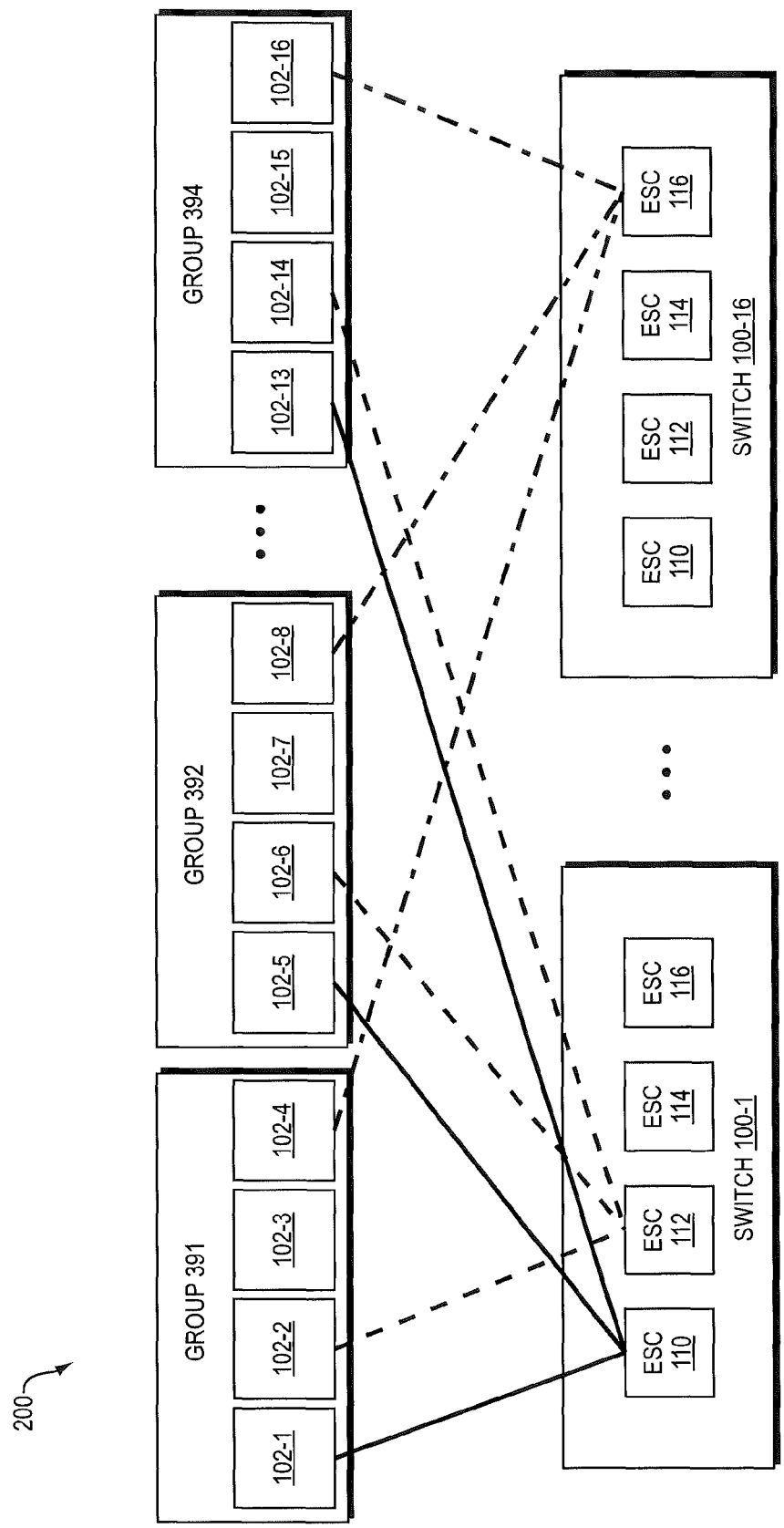
FIG. 3 illustrates connections among devices in the building block of FIG. 2.

FIG. 3 illustrates the connections between the devices in the first tier and the second tier. Illustratively, continuing the example of FIG. 2 that includes 16 switches 102-1 through 102-116 in the second tier, these 16 switches may be considered as four groups 391-394 of four switches. Each switch 100 in the first tier may have four connections to each of groups 391-394 in the second tier. Each ESC 110-116 in each switch 100 in the first tier may have one connection to each group 391-394. The numbers of connections here are merely illustrative. For example, ESC 110-1 may be coupled to switch 102-1 in Group 391, switch 102-5 in Group 392, switch 102-9 in Group 393 (not shown), and switch 102-13 in Group 394. Similarly, ESC 112-1 may be coupled to switch 102-2 in Group 391, switch 102-6 in Group 392, switch 102-10 in Group 393 (not shown), and switch 102-14 in Group 394. For ease of illustration, not all of the groups 391-394, first tier switches 100-1 through 100-16, second tier switches 102-1 through 102-16, and ESCs 110-116 are shown. However, it should be understood that links between such components may be included according to the patterns described and illustrated.

As mentioned above, the data center networking fabric may also include a third tier of components. For example, as shown in FIG. 4A, a supercluster 400 includes a number of core switches 480. The core switches 480 may be, for example, spines, high-capacity routers, or backplanes. For example, each of the core switches 410 may include 480 ports for connecting downlinks to tier 2 switches. According to the example of FIG. 4A, 128 of the core switches 480 may be present in the third tier, and may be coupled to 60 of the building blocks 200 described in FIGS. 2-3. For example, each of the 60 building blocks 200 may be connected to each of the core switches 480 (e.g., block 200-1 uplinks to core switches 410-1 through 410-128, block 200-2 uplinks to core switches 410-1 through 410-128, etc. Accordingly, each building block 200 may have 128 uplinks, with each uplink coupled to one spine 480.

The supercluster 400 may be capable of serving 92,160 host devices. It should be understood that multiple such superclusters 400 may be built to serve an even greater number of host devices. The worst case latency for the supercluster 400 may be 6.5 µs-9.3 µs (e.g., 0.75 or 1.5 times the number of hops).

Figure 4B:
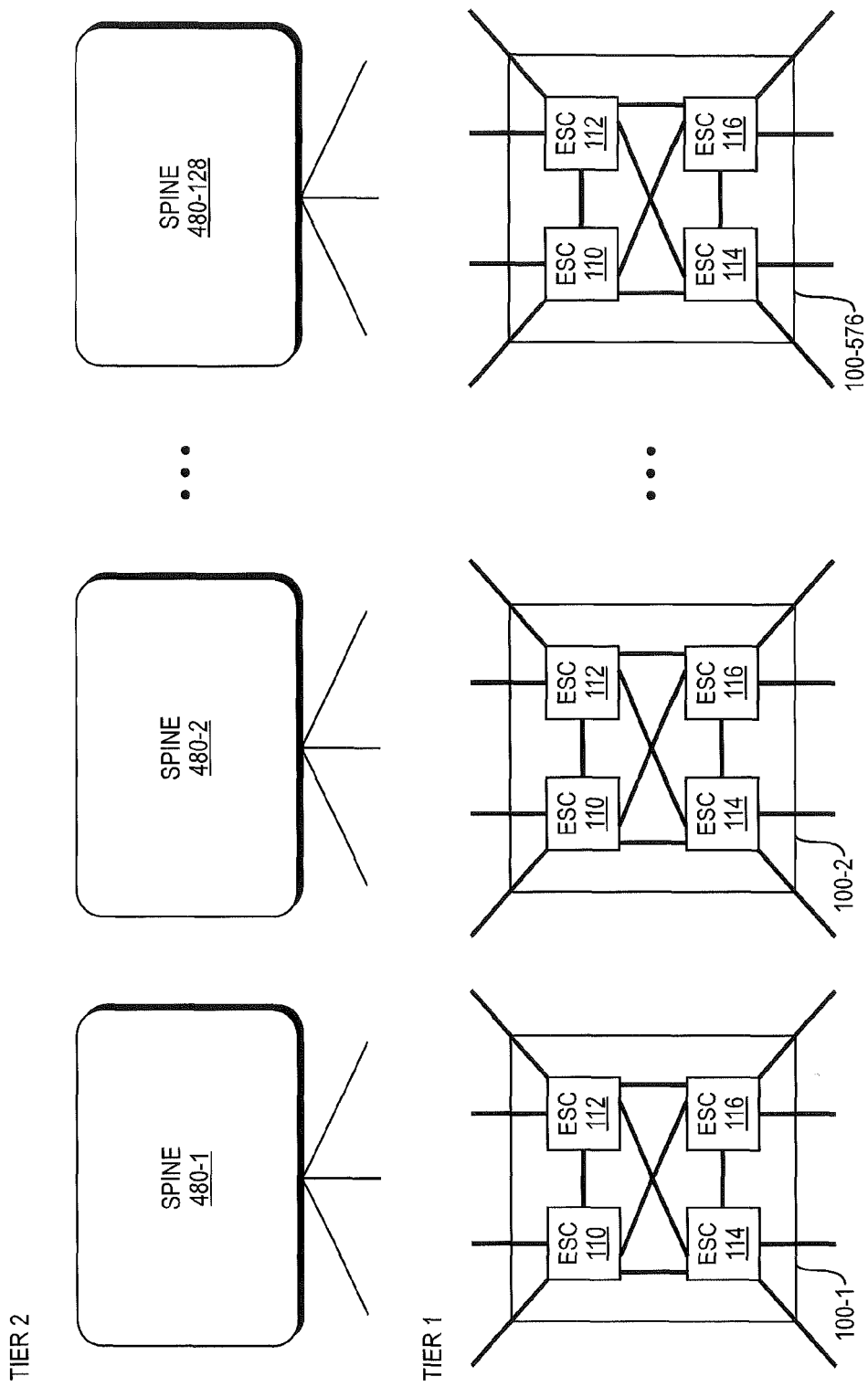
FIG. 4B illustrates a two-tier cluster according to an aspect of the technology.

According to an alternative aspect, the switching topology may comprise a two-tier cluster, for example, as illustrated FIG. 4B. In this example, 64 core switches 410 may be used in a second tier to link up to 576 switches in a first tier. For example, each spine 480 may include 576 ports, wherein each port may be used to downlink to one of the switches 100. Correspondingly, each switch 100 may have 64 uplinks (e.g., 10 GE capable links), such that each switch 100 is connected to each spine 480. Each switch 100 may also include a number of ports for linking to host devices. According to one example, the switches 100 may include up to 96 such ports.

The network fabric described above may be capable of various types of routing. For example, intra-switch routing may be performed to handle traffic where the destination for such traffic is linked to the same switch. Intra-switch routing may also occur as one ESC of a switch receives traffic and spreads such traffic among the other ESCs of the switch. Intra-block routing may be performed when the traffic destination is linked to a different switch in the same building block. Inter-block routing may be performed when the destination is linked to a different building block (e.g., routing the traffic through the third tier spine).

Intra-block routing may be performed in at least a few scenarios. For example, in a first scenario, the source and destination hosts of a packet may be linked to the same group of four Tier 1 building blocks and to corresponding ESCs (e.g., ESCs having a same chip identifier) in that group. For example, the sources host may be linked to ESC 112-4 and the destination host may be linked to ESC 112-4, or the source may be linked to ESC 116-7 and the destination may be linked to ESC 116-5. In this case, the traffic may be switched through a Tier 2 ESC in 4 hops with no blocking or oversubscription of the ESCs or the links therebetween.

In a second scenario, the source and destination hosts may be linked to different Tier 1 groups and to corresponding ESCs (e.g., source host is linked to ESC 114-1 and destination host is linked to ESC 114-16). In this case, the traffic may be switched through a Tier 2 switch, for example, in 6 hops.

In a third scenario, the source and destination hosts may be linked to the same Tier 1 group, but to non-corresponding ESCs within the switches of that block. For example, the source host may be linked to ESC 112-1 and the destination host may be linked to ESC 114-2. In this instance, the traffic between the source and destination hosts may be switched in a Tier 1 switch in 6 hops.

In a fourth scenario, the source and destination hosts may be linked to different Tier 1 groups and to non-corresponding ESCs (e.g., source may be linked to ESC 112-1 and destination may be linked to ESC 110-16). In this instance, traffic may be routed through a Tier 1 switch and a Tier 2 switch, for example, in 8 hops.

Uplink traffic within one of the building blocks 200 may be switched in 2 hops with no blocking. For example, the uplink traffic may be load-balanced among 64 uplinks (e.g., 16 uplinks per switch, and four switches in each Tier 2 block), each uplink being 40GE capable. Downlink traffic may be switched in either 6 hops or 4 hops in each building block 200, depending on, for example, the connections between each building block 200 and the spine 480. For example, the downlink traffic may be switched 6 hops in Tier 2 and the destination switch if each building block 200 is connected to a spine 480 via one 40GE capable link. The downlink traffic may be switched in 4 hops if each building block 200 is connected to the spine 480 via four 40GE capable links.

Figure 5A:
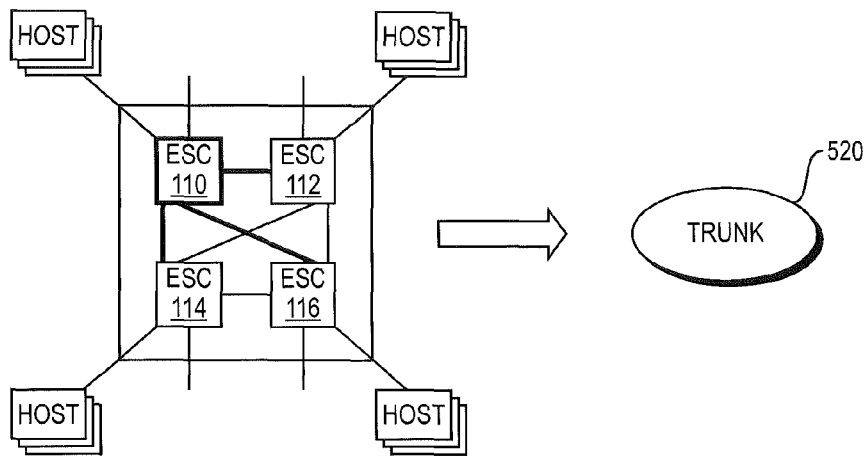
FIGS. 5A-C illustrate examples of routing within a first tier of the building blocks of FIG. 2.
Figure 5B:
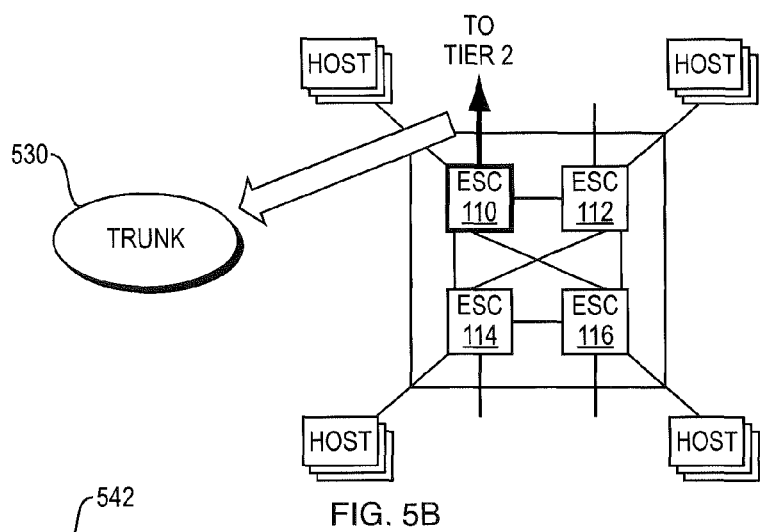
Figure 5C:
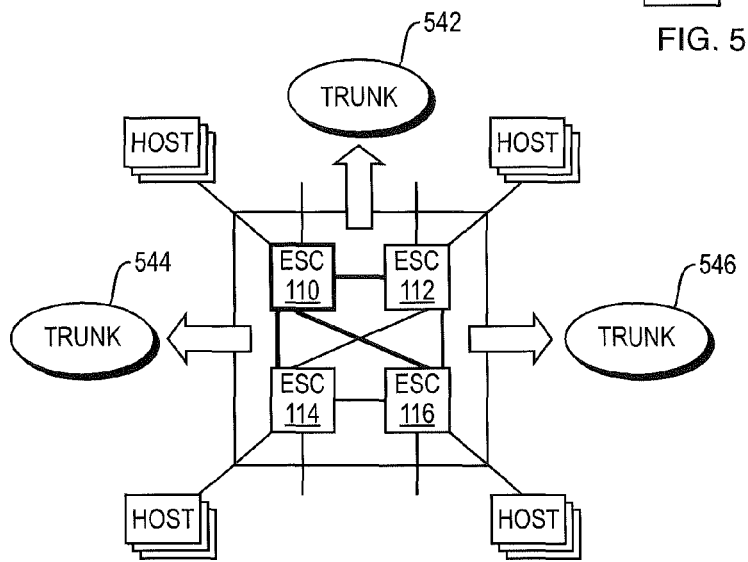

FIGS. 5A-5C illustrate examples of how intra-block routing is performed within the building blocks 200. In each of FIGS. 5A-5C, a first tier (Tier 1) switch in the building block is shown, including four ESCs 110-116. Each ESC 110-116 sets up below trunks 520, 530, 542-546 (e.g., logical bundles, HiGig trunks) with dynamic load balancing (DLB). In each case, the trunks 520, 530, 542-546 are described with respect to a single ESC (e.g., ESC 110) in the switch. However, it should be understood that the logic described herein may be applied to each of the ESCs in the switch and in the other switches in the Tier 1. Links, such as the links 12, 130, 140 described with respect to FIG. 1, may belong to one or more trunks 520, 530, 542-546.

Referring to FIG. 5A, trunk 520 may include each of the links coupled between the ESC 110 and the other ESCs in the switch. The trunk 520 may be used for intra-switch traffic, e.g., to link a given ESC to each of the other three ESCs in the switch. The trunk 520 may include, in total, 24 links.

Referring to FIG. 5B, trunk 530 may be used for uplink traffic. For example, the trunk 530 may link the ESC 110 to the switches in Tier 2. The trunk 530 may include 16 links.

Referring to FIG. 5C, trunks 542, 544, 546 may be used for transit intra-switch traffic. For example, the trunk 542 may be used fr the link between the ESC 110 and the ESC 112, the trunk 544 may be used for the link between the ESC 110 and the ESC 114, and the trunk 546 may be used for the link between the ESC 110 and the ESC 116. Each of the trunks 542-546 may include eight links.

Figure 6A:
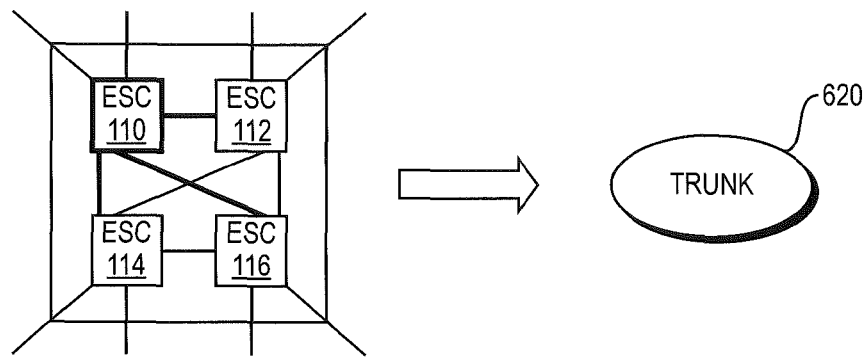
FIGS. 6A-C illustrate examples of routing within a second tier of the building blocks of FIG. 2.
Figure 6B:
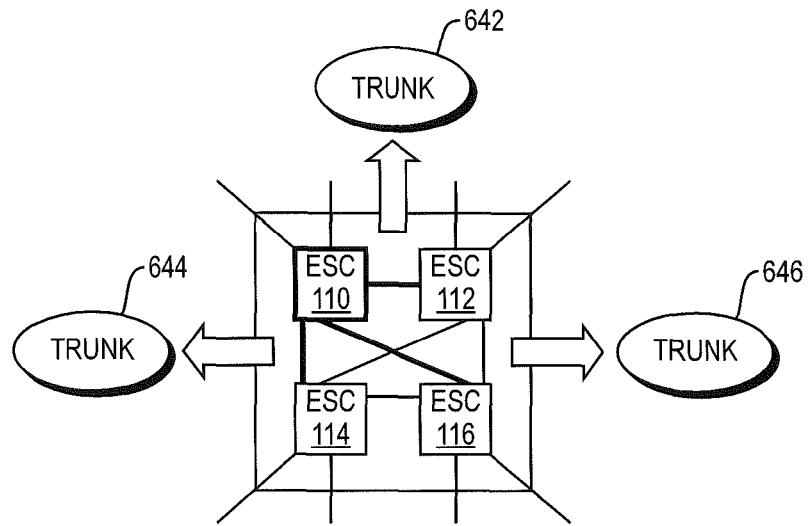
Figure 6C:
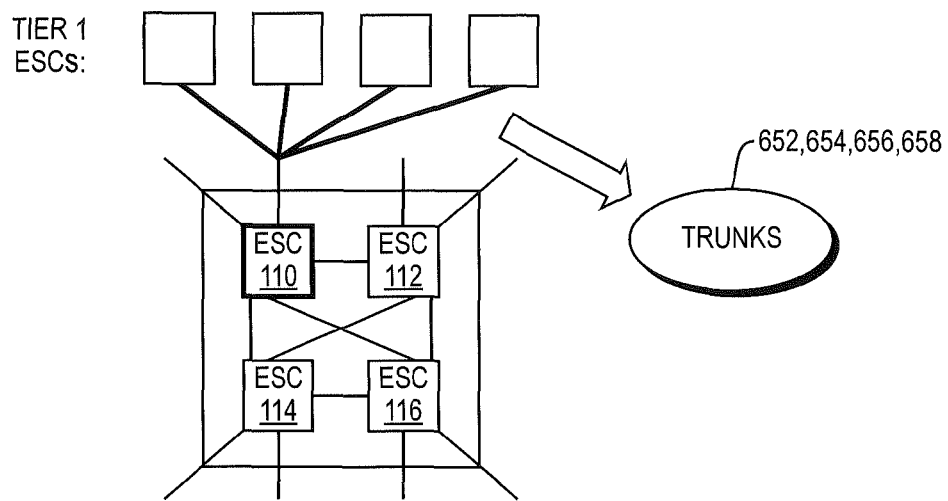

FIGS. 6A-6C illustrate intra-block routing within the second tier (Tier 2) of a switch in a building block. The Tier 2 switch may perform switching of traffic from Tier 1. Such switching may include, for example, 1-2 hops and may be performed according to HiGig or any other switching protocol. Each ESC of Tier 2 may set up below trunks 620, 642-644, and 652-658, similar to the trunks described above with respect to FIGS. 5A-5C. Although the trunks 620, 642-644, and 652-658 are described herein with respect to the Tier 2 ESC 110, it should be understood that the ESCs 112, 114, 116 include similar logical connections.

Referring to FIG. 6A, the trunk 620 may be used to transmit the first hop of Tier 1 traffic switched in Tier 2. For example, the trunk 620 may include all of the links between the ESC 110 and the ESCs 112, 114, 116. As such, the trunk 620 may include, for example, 24 links.

Referring to FIG. 6B, the trunks 642-646 may be used to transmit the second hop of Tier 1 traffic switched in Tier 2. Each of these trunks 642-646 may include eight links to each of the other three ESCs 112-116 in the same switch.

Referring to FIG. 6C, the trunks 652-658 may each connect the ESC 110 to a Tier 1 ESC. These trunks may each include four links.

Figure 7:
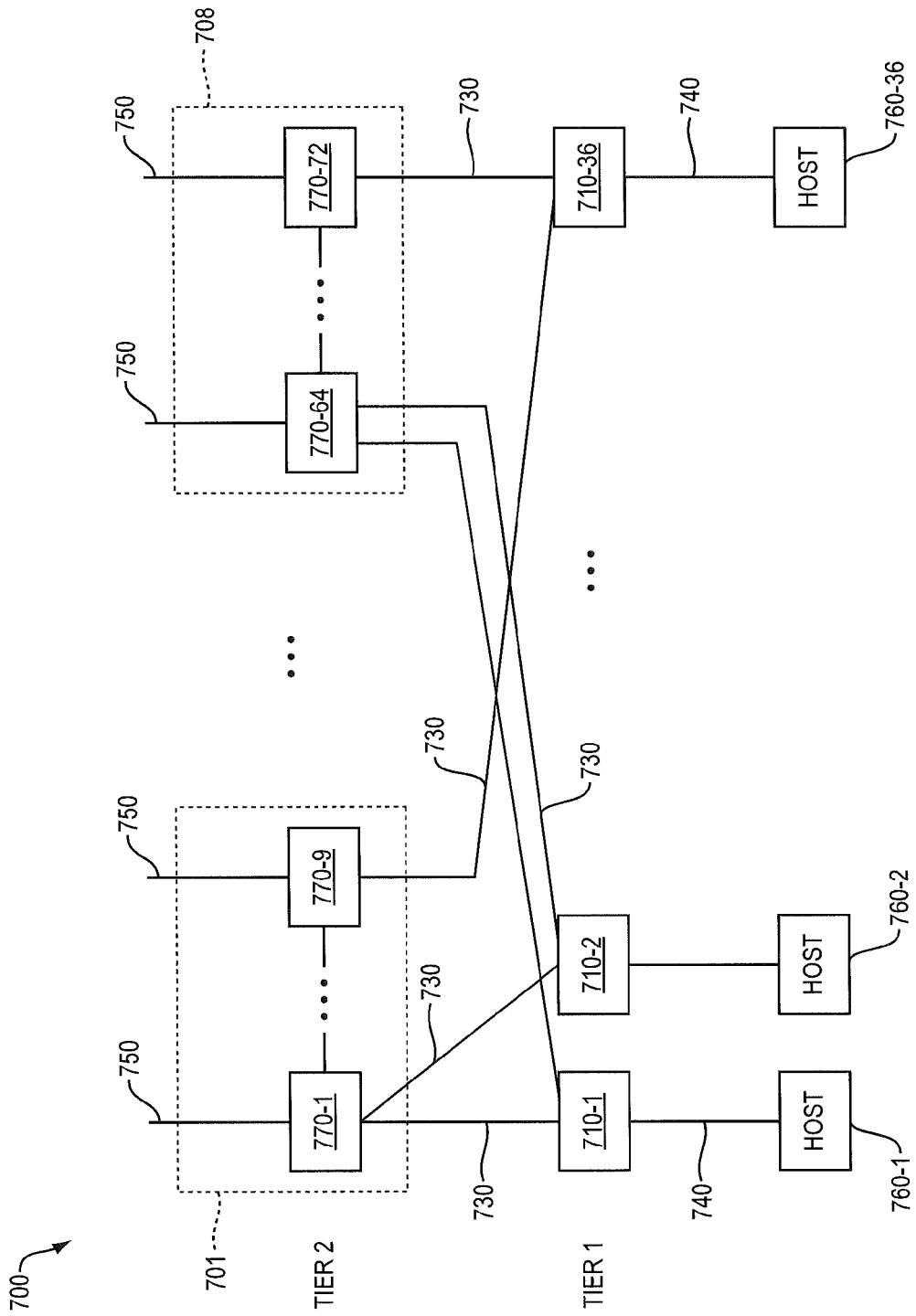
FIG. 7 illustrates an example of a superblock according to aspects of the technology.

According to another aspect of the technology, the concepts discussed above may be applied to build a superblock. An example of a superblock 700 is illustrated in FIG. 7.

As shown, the superblock includes a multi-stage architecture, including Tier 1 and Tier 2. The components of Tier 1 may be downlinked to a plurality of host devices (not shown) via links 740 and uplinked to the components of Tier 2 via a plurality of links 730. The components of Tier 2 may be uplinked to one or more core switches (not shown) via links 750.

Tier 1 may include a number of ESCs 710-1 through 710-36. Each ESC 710 may be downlinked to, for example, 32 host devices via links 740. These links 740 may be 10GE capable. The uplinks 730 to Tier 2 may be 40GE capable.

Tier 2 includes a plurality of arrays 701-708, each array including a plurality of ESCs 770. For example, the array 701 may include ESCs 770-1 through 770-9, while the array 708 includes ESCs 770-64 through 770-72. The ESCs 770 in each array 701-708 may be interconnected via links 720. According to one aspect, each ESC 770 in a given array 701-708 may be directly interconnected to each other ESC 770 in that same array. For example, in the array 701, ESC 770-1 may be linked to each of ESCs 770-2 through 770-9, ESC 770-2 may be linked to each of ESCs 770-1 and 770-3 through 770-9, etc. According to another aspect, some ESCs 770 may be directly linked to one or more ESCs in the same array, but only indirectly (e.g., through an intermediate chip) linked to other ESCs.

Each ESC 710-1 through 710-36 in Tier 1 may be linked to one of the arrays 701-708 in Tier 2. For example, according to one aspect, each ESC 710-1 through 710-36 may be linked to one ESC 770 in each array 701-708. For example, as shown, Tier 1 ESCs 710-1 and 710-2 are each connected to ESC 770-1 and 770-64 of arrays 701 and 708, respectively, via links 730. ESC 710-36 may be linked to Tier 2 ESCs 770-9 and 770-72 of arrays 701 and 708, respectively.

Figure 8:
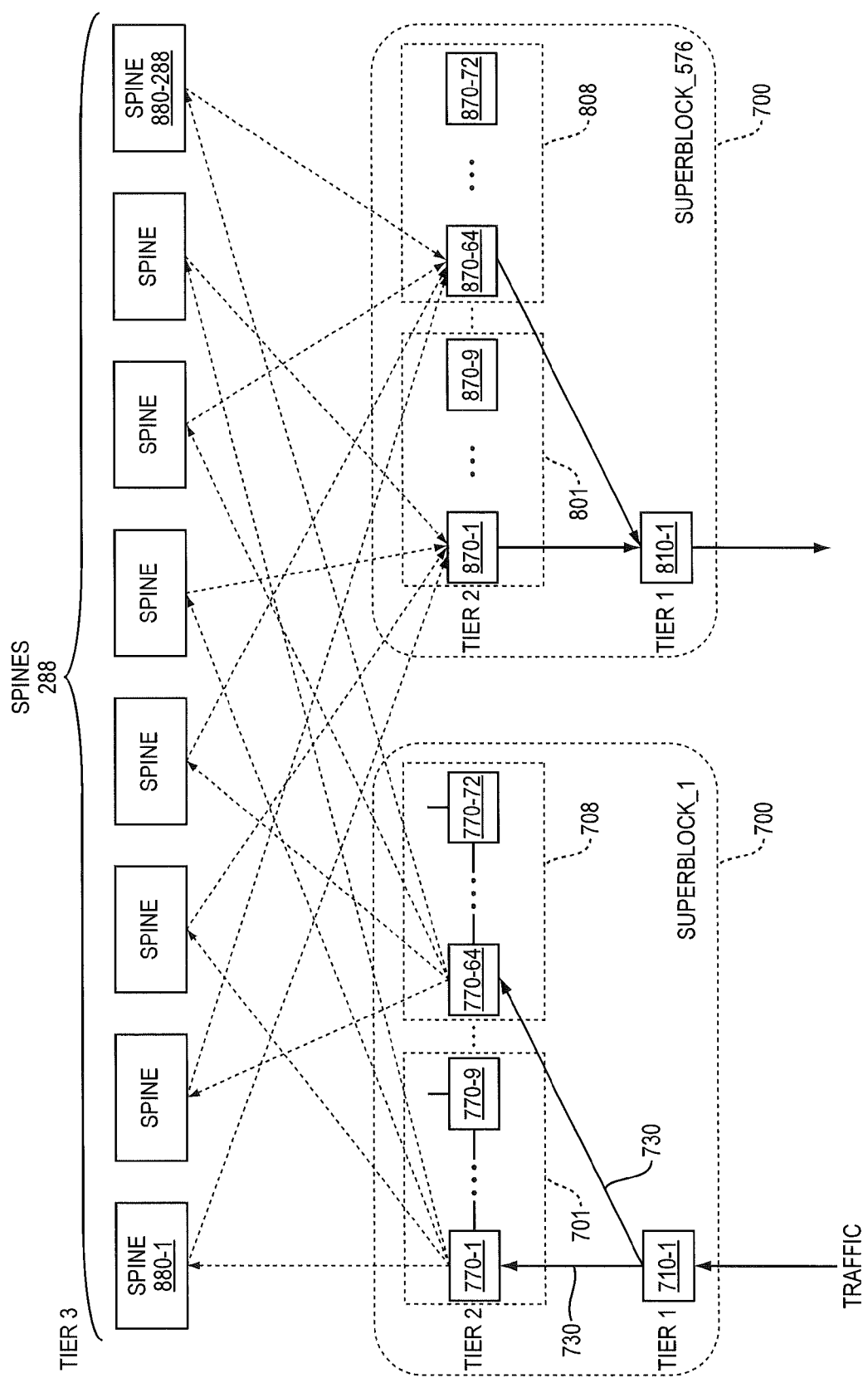
FIG. 8 illustrates an example of inter-superblock routing according to aspects of the technology.

The arrays 701-708 may be further linked to components of a third stage, such as one or more core switches, via uplinks 750. For example, FIG. 8 illustrates an example of inter-superblock routing according to aspects of the technology. As shown, a plurality of core switches 880 are included in a third tier and provide interconnections for a plurality of superblocks 700. In this example, 288 core switches 880 are provided to interconnect 576 superblocks 700. However, it should be understood that any number of core switches 880 and superblocks 700 may be used to scale the network fabric up or down as appropriate for the given application.

Each ESC 770 in Tier 2 of each superblock 700 may include a plurality of uplinks to the core switches 800. The number of uplinks may be determined based on, for example, the number of data ports on the ESC 770, the number of links between the ESC 770 and the Tier 1 ESCs 710, and/or the number of interconnections to other ESCs 770 within the same array 701-708. In the present example, each Tier 2 ESC 770 of each superblock includes four uplinks to Tier 3. Thus, for example, each ESC 770 may be linked to four core switches 880. For example, ESC 770-1 may include uplinks to core switches 880-1 through 880-4, ESC 770-2 may include uplinks to core switches 880-5 through 880-8, etc.

The topology described in FIG. 8 may be used for efficient inter-superblock routing. For example, traffic may be received at a particular Tier 1 chip of a given superblock, such as chip 710-1 of superblock 700-1. A destination node for the traffic may be linked to ESC 710-1 of superblock 700-576. Accordingly, the traffic may be routed up through Tier 2 of the superblock 700-1 to the spine 880 and to the superblock 700-576. For example, the traffic received at the ESC 710-1 of superblock 700-1 may be spread out amongst the Tier 2 arrays 701-708 of the superblock 700-1. For example, a hashing function may be performed to distribute the traffic among the arrays 701-708 (e.g., equal cost multi-path routing). The traffic may be distributed to one or more ESCs 770 in each array 701-708, such as to ESC 770-1, 770-64, etc., via uplinks 730. According to one aspect, the traffic may be further spread amongst each ESC 770 of each array 701-708. The traffic may be transmitted from the Tier 2 arrays 701-708 through one or more core switches 880 to one or more arrays 801-808 of the superblock 700-576. The traffic may further be transmitted from the arrays 801-808 to the Tier 1 ESC 810-1 for delivery to the destination node.

Figure 9:
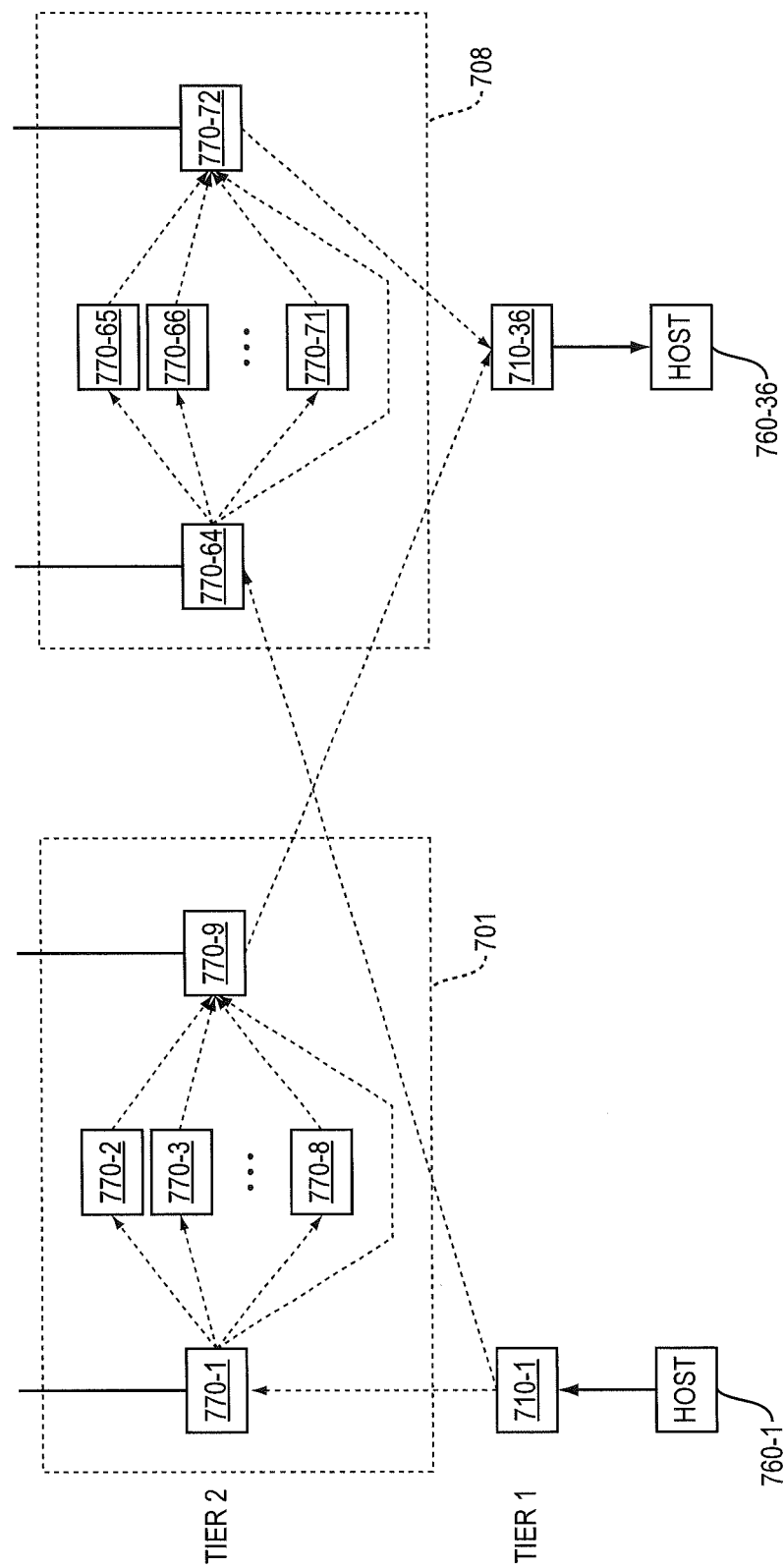
FIG. 9 provides an example of intra-superblock routing according to an aspect of the technology.

FIG. 9 provides an example of intra-superblock routing according to an aspect of the technology. According to this example, traffic from a host device 760-1 may be received at the Tier 1 chip 710-1. A destination for the traffic may be host device 760-36, which is linked to Tier 1 chip 710-36. Accordingly, the traffic may be routed up through one of the arrays 701-708.

According to one aspect, each Tier 1 ESC 710 may be linked to one ESC 770 in each array 701-708. For example, the ESC 770-1 may be linked to ESC 770-1 of array 701, ESC 770-10 (not shown) of array 702 (not shown), and so forth, also being linked to chip 770-64 of array ck 708. Similarly, the chip 710-36 may be linked to Tier 2 chips 770-9 (array 701), 770-18 (not shown, in array 702, also not shown), and so forth through and including chip 770-72 of array 708.

In routing the traffic from the Tier 1 chip 710-1 to Tier 2, the traffic may be distributed across the arrays 701-708, for example, using a hash function. This traffic may be further distributed among the plurality of chips 770 in each array 701-708. For example, the chip 701-1 may transmit at least some of the traffic to chip 770-1 in array 701 of Tier 2. In turn, the chip 770-1 may distribute the traffic among chips 770-2 through 770-9, as shown. Traffic that is distributed among intermediary chips 770-2 through 770-8 may be further transmitted to chip 770-9 for delivery to the Tier 1 chip 710-36. Similarly, the chip 710-1 may transmit some of the traffic to the other arrays 701-708 in the superblock, through and including array 708. For example, the chip 710-1 may send the traffic to chip 770-64, which may further distribute the traffic among chips 770-65 through 770-72. The chip 770-72 may send the traffic down to the chip 710-36 for delivery to the destination host device 760-36.

Figure 10:
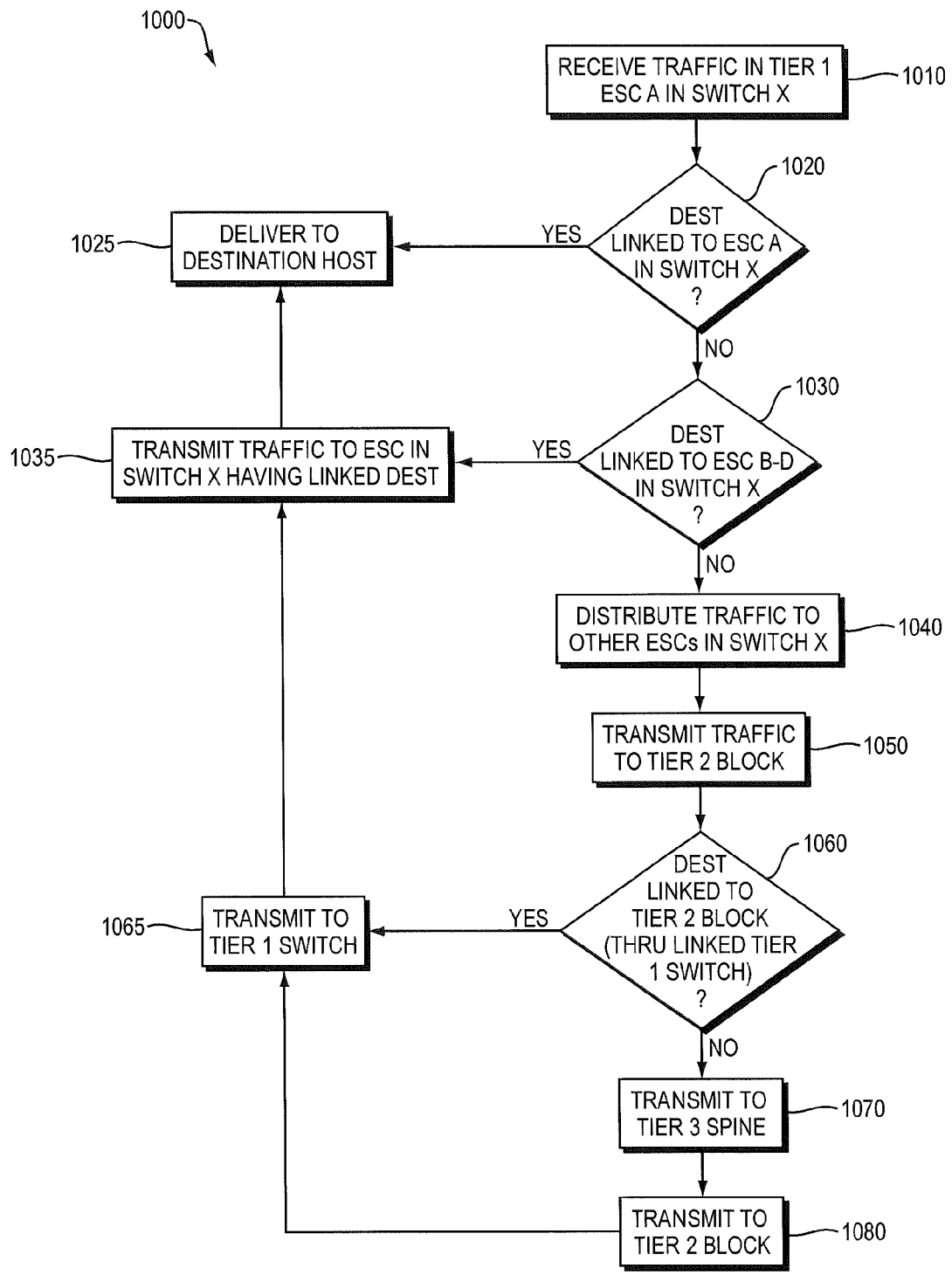
FIG. 10 illustrates a method according to aspects of the technology.

FIG. 10 illustrates a method 1000 according to aspects of the technology. According to this method, traffic, such as data packets, are routed through a network from a source host to a destination host. The network may be any type of network, such as a data center, a LAN, or a WAN, or even a multi-stage processing chip. While various stages of the method are illustrated and described in a particular order, it should be understood that these stages do not have to be performed in this order. Rather, various stages may be handled in a different order or simultaneously, and stages may also be added or omitted unless otherwise stated.

At stage 1010, traffic is received at a first tier switching chip (Tier 1 ESC A) in a switch (Switch X). The particular ESC in Tier 1 which receives the traffic may depend on the source of the traffic (e.g., traffic from a particular host may be transmitted to a linked ESC).

In stage 1020, it is determined whether a destination for the packet is linked to the ESC A in Switch X. For example, if the destination host is linked to the same ESC (ESC A) as the source host, the traffic may be delivered to the destination through the ESC A (stage 1025). However, if the destination is not linked to the ESC A, additional hops may be required.

In stage 1030, it is determined whether the destination of the traffic is linked to another ESC (e.g., ESC B-D) in the Switch X. If this is the case, the traffic may be transmitted to that ESC in stage 1035. Otherwise, the traffic may be distributed to the other ESCs (e.g., ESCs B-D) in the Switch X (stage 1040). For example, as packets are received by the ESC A, they may be equally distributed across all the ESCs in the Switch X so as to prevent overloading of a particular ESC.

At stage 1050, the distributed traffic may be transmitted to a Tier 2 block. This block may be, for example, one of the groups 391-394 described with respect to FIG. 3, one of the arrays 701-708 described with respect to FIGS. 7-9, or any other architecture having multiple linked switching chips. The particular Tier 2 block to which the traffic is transmitted from Tier 1 may depend on, for example, where the destination host is linked in the network. According to one aspect, the traffic may be further distributed among ESCs in the Tier 2 block to further prevent congestion.

At stage 1060, it is determined whether the destination for the traffic is linked to the Tier 2 block. For example, the given Tier 2 block may include a number of downlinks to various Tier 1 switches and/or ESCs. If one of those downlinks connects to a switch or ESC that is coupled to the destination host, the traffic may be transmitted to that Tier 1 switch/ESC (stage 1065) for delivery to the destination.

If, however, it is determined that the Tier 2 block is not linked to the destination through a Tier 1 device, the traffic may be transmitted to a Tier 3 device, such as a spine, in stage 1070. The Tier 3 device may be coupled to a plurality of Tier 2 devices. According to one aspect, a plurality of core switches may be present, where at least one spine links each pair of Tier 2 blocks. Accordingly, the traffic may be transmitted to the spine which is also linked to the destination of the traffic. In stage 1080, the traffic may be transmitted to the appropriate Tier 2 block, and further transmitted through Tier 1 to the destination.

The above-described aspects of the technology may be advantageous in providing effective use of bandwidth within a collection of chips and switches in a single tier of the architecture. For example, the distribution of traffic among chips and switches in a tier reduces congestion as compared to an architecture having many tiers of simple one-chip switches. Moreover, the congestion is managed at a lower tier of a network hierarchy, where it is less expensive.

Additionally, the techniques described above may be flexible. For example, these techniques may be used to build a superblock either with a building block or a third tier spine.

The building blocks may be a single domain, and therefore no Internet Protocol address change is required for hosts moving within the building block. Further, Lightpeak may be used to double the scale of the building blocks and provide cost effective interconnect.

Although the present invention has been described with reference to particular embodiments, it should be understood that these examples are merely illustrative of the principles and applications of the present invention. For example, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made to the illustrative embodiments. For example, the steps taken to derive the lowest cost number of moves within the TCAM may be modified. However, these and that other arrangements may be devised without departing from the spirit and scope of the present invention as defined by the appended claims.

The invention claimed is:

1. A switching fabric, comprising:
a first tier comprising a first plurality of switches;
a second tier comprising a second plurality of switches, wherein the switches in the first tier are coupled to the switches in the second tier via one or more links;
a third tier comprising one or more core switches, wherein each switch in the second tier is coupled to at least one of the core switches via one or more links;
wherein each switch of the first plurality of switches and second plurality of switches comprises a plurality of switching chips, each of the plurality of switching chips being coupled via intra-switch links to each other switching chip in the switch; and
wherein each of the switching chips in the first tier is further coupled to a host device via a bundle of links.

2. The fabric of claim 1, wherein each switch of the first plurality of switches and the second plurality of switches comprises four switching chips.

3. The fabric of claim 1, further comprising a building block, the building block comprising:
16 of the first plurality of switches; and
16 of the second plurality of switches;
wherein each switching chip in the first plurality of switches is linked to at least one switch in the second plurality of switches.

4. The fabric of claim 3, wherein:
a first switching chip in a first switch of the first plurality of switches is linked to a first switch in each group of the second tier;
a second switching chip in the first switch of the first plurality of switches is linked to a second switch in each group of the second tier;
a third switching chip in the first switch of the first plurality of switches is linked to a third switch in each group of the second tier; and
a fourth switching chip in the first switch of the first plurality of switches is linked to a fourth switch in each group of the second tier.

5. The fabric of claim 3, further comprising a supercluster, the supercluster comprising:
a plurality of building blocks; and
a plurality of core switches;
wherein each building block includes an uplink to each of the plurality of core switches.

6. The fabric of claim 5, wherein the plurality of building blocks comprises 60 building blocks, and the plurality of core switches comprises 128 core switches.

7. The fabric of claim 5, wherein each of the core switches includes 480 ports.

8. The fabric of claim 1, wherein the second tier further comprises at least one group, each group comprising four of the second plurality of switches.

9. A switch, comprising:
a plurality of switching chips; and
a plurality of intra-switch link bundles, the plurality of intra-switch link bundles coupling each of the plurality of switching chips to each of the other of the plurality of switching chips.

10. The switch of claim 9, wherein each of the plurality of link bundles comprises 8 links.

11. The switch of claim 9, wherein the switching chips are Ethernet switching chips.

12. A network fabric, comprising:
a superblock, the superblock comprising:
a first tier comprising a plurality of switching chips, the switching chips being linked to host devices via one or more links; and
a second tier comprising a plurality of arrays, each of the plurality of arrays comprising a predetermined number of switching chips, wherein at least one first switching chip in each array is linked to each other switching chip in the same array via one or more links;
wherein each of the plurality of switching chips in the first tier is linked to the at least one first switching chip in each array; and
wherein the at least one first switching chip in each array is linked to a device in a third tier.

13. The network fabric of claim 12, wherein each of the predetermined number of switching chips in each array is linked to each other switching chip in that array.

14. The network fabric of claim 12, wherein each array comprises nine switching chips.

15. The network fabric of claim 14, wherein the plurality of switching chips in the first tier includes 36 switching chips, and the plurality of arrays includes 8 arrays.

16. The network fabric of claim 12, further comprising:
a plurality of the superblocks; and
a plurality of core switches;
wherein the at least one first switching chip in the second tier of each array is linked to one or more of the plurality of core switches.

17. The network fabric of claim 16, wherein the plurality of superblocks includes 576 superblocks, and the plurality of core switches includes 288 core switches.

18. The network fabric of claim 17, wherein the at least one first switching chip in the second tier of each array is linked to four core switches.

19. A method of routing data within a network fabric comprising at least one switch, wherein the at least one switch comprises a first plurality of switching chips, each switching chip being linked via intra-switch links to each other switching chip in the switch, and at least one processor adapted to control the plurality of switching chips, the method comprising:
receiving data traffic at a first switching chip;
distributing the data traffic among each of the other switching chips in the first plurality of switching chips;
transmitting the traffic to a block, the block comprising a second plurality of switching chips arranged in a higher network tier with respect to the at least one switch;

determining whether the traffic destination is linked to one of the second plurality of switching chips through a second lower tier switch;

transmitting the traffic to the second lower tier switch if the traffic destination is so linked; and transmitting the traffic to a device in hierarchy higher network tier if the traffic destination is not so linked.

20. The method of claim 19, further comprising:

determining, using the processor, whether a destination for the traffic is linked to the first switching chip;

if the destination for the traffic is linked to the first switching chip, delivering the traffic to the destination;

determining whether the destination for the traffic is linked to one of the other switching chips in the first plurality of switching chips; and if the destination for the traffic is linked to one of the other switching chips, transmitting the traffic to the one of the other switching chips.

21. The method of claim 19, further comprising distributing the traffic among each of the second plurality of switching chips in the block.

\* \* \* \* \*